United States Patent [19]
Tanaka et al.

[11] 4,096,126
[45] Jun. 20, 1978

[54] THERMOPLASTIC COPOLYESTER ELASTOMER

[75] Inventors: Chiaki Tanaka, Chita; Shinobu Nakajima; Masanobu Morikawa, both of Nagoya, all of Japan

[73] Assignee: Toray Industries, Inc., Tokyo, Japan

[21] Appl. No.: 713,630

[22] Filed: Aug. 12, 1976

[30] Foreign Application Priority Data

Aug. 22, 1975 Japan ................. 50-101159

[51] Int. Cl.$^2$ ............................................. C08G 63/18
[52] U.S. Cl. ................................. 260/75 R; 260/75 T
[58] Field of Search ................................... 260/75 R

[56] References Cited

U.S. PATENT DOCUMENTS

| 2,968,065 | 1/1961 | Gronholz | 264/289 |
| 3,136,677 | 6/1964 | Woker | 260/75 R X |
| 3,682,863 | 8/1972 | McHale | 260/75 R |
| 3,766,146 | 10/1973 | Witsiepe | 260/75 R |
| 3,817,935 | 6/1974 | Beer | 260/75 R |
| 3,926,920 | 12/1975 | Georgoudis et al. | 260/75 R |

OTHER PUBLICATIONS

Hill et al., *J. Polymer Sci.*, 3(5), (1948), pp. 609–630.

*Primary Examiner*—Walter C. Danison
*Attorney, Agent, or Firm*—Miller & Prestia

[57] ABSTRACT

A thermoplastic copolyester elastomer which comprises dicarboxylic acid component mainly composed of terephthalic and phthalic acids, wherein the molar ratio of terephthalic acid to phthalic acid is from about 80/20 to 35/65, and diol component mainly composed of 1,4-butanediol. The elastomer has excellent thermal stability and weatherability and can be improved in the elastomeric properties by orientation of polymer molecule before crystallization.

7 Claims, No Drawings

THERMOPLASTIC COPOLYESTER ELASTOMER

BACKGROUND OF THE INVENTION

Thermoplastic copolyester elastomers such as segmented copolyester ether have been known heretofore in U.S. Pat. Nos. 3,651,014 and 3,766,146. Those copolyester elastomers are composed of hard segments, consisting of butylene terephthalate chain, and soft segments consisting of poly tetramethyleneoxide glycol chain. The segmented copolyester ether resins have such a good processability and thermal stability at a molding temperature and a short cycle of molding in comparison with other thermoplastic elastomers such as styrene-butadiene-styrene block copolymer and polyurethane. They also have insensitivity to moisture and good elasticity at low temperatures. The segmented copolyester ether, however, have defects in respect to thermal stability and weatherability because of the presence of a polyether segment in the polymer main chain which is essentially poor in thermal stability and weatherability.

Thus, the object of the present invention is to provide thermoplastic polyester elastomer improved in thermal stability and weatherability.

We now have found that the butylene terephthalate-butylene phthalate copolyester has a remarkable elastomeric property.

SUMMARY OF THE INVENTION

The present invention is to provide a thermoplastic copolyester elastomer which comprises dicarboxylic acid component mainly composed of terephthalic acid(T) and phthalic acid(O), wherein the T/O molar ratio is about 80/20 to 35/65, and a diol component mainly composed of 1,4-butanediol.

The T/O ratio in the dicarboxylic acid component of the copolyester of the present invention is essential to give the copolyester an elastomeric property. The T/O molar ratio should be about 80/20 to 35/65, preferably about 70/30 to 40/60. The diol component should be mainly composed of 1,4-butanediol. Use of 1,4-butanediol as the diol component gives a copolyester a good moldability, crystallinity and thermal stability, and furthermore, by using 1,4-butanediol a high molecular weight copolyester can be obtained. When the T/O molar ratio is more than about 80/20, the copolyester does not have an enough flexibility and elasticity. When the T/O ratio is less than about 35/65, the copolyester is not practically useful in respect of the thermal property, and has a poor processability in injection molding and polymerizability.

In the present invention it is essential to use terephthalic and phthalic acid as the dicarboxylic acid component and 1,4-butanediol as the diol component. When phthalic acid is replaced with isophthalic acid, the copolyester has a high modulus, i.e., a poor flexibility and elastic recovery. When an aliphatic dicarboxylic acid such as sebacic and adipic acid is used in place of phthalic acid, the Young's modulus of the copolyester becomes low enough, that is the polymer becomes flexible, but the elastic recovery of the polymer is not satisfactory. Therefore, the necking of a molded article of such a copolyester easily takes place, when it is elongated.

In the case that ethylene glycol is used in place of 1,4-butanediol it is difficult to obtain a copolyester having a high molecular weight, and the copolyester have inferior moldability because of its late crystallization.

Thus, the copolyester of the present invention may contain other comonomer units at most about 20 mol%. As a comonomer for the dicarboxylic acid component, aromatic dicarboxylic acids such as isophthalic acid, 2,6-naphthalenedicarboxylic acid, 1,5-naphthalenedicarboxylic acid, diphenyl-p,p'-dicarboxylic acid, bis(p-carboxyphenyl) methane, anthracene dicarboxylic acid, 4,4'-diphenylether dicarboxylic acid, ethylene-bis-p-benzoic acid, 1,4-tetramethylene-bis-p-benzoic acid, and p-phenylene di-acetic acid, and aliphatic or alicyclic dicarboxylic acids such as adipic acid, suberic acid, azelaic acid, sebacic acid, dodecane dicarboxylic acid and 1,4-cyclohexane dicarboxylic acid may be used. As a comonomer for diol component, there may be used ethylene glycol, 1,2- and 1,3-propylene glycol, 1,3-butanediol, 1,5-pentanediol, neopentyl glycol, 1,6-hexanediol, decamethylene glycol, diethylene glycol, 1,3- and 1,4-cyclohexane dimethanol, p-dihydroxymethyl benzene, m-dihydroxymethyl benzene and 2,2-di(p-hydroxyphenyl)propane.

Furthermore, polyfunctional comonomer having more than three functional groups may be used for the purpose of elevating the melt viscosity of the copolyester and shortening the polymerization period. The amount of such polyfunctional components may be 0.02 to 5.0, preferably 0.05 to 3.0 mol% on the basis of the dicarboxylic and/or diol components. The polyfunctional comonomer used for such purposes may be trimellitic acid, trimesic acid, pyromellitic acid, 3,3',4,4'-benzophenone tetracarboxylic aicd, 1,2,3,4-butane tetracarboxylic acid, esters or anhydrides of these polycarboxylic acids, glycerin and pentaerythrytol.

The copolyester of the present invention may be prepared by a conventional method. Dimethyl terephthalate and dimethyl phthalate may be heated with an excess molar amount of 1,4-butanediol, i.e., about 1.05 to 2.0 mol per mol of the dicarboxylic acid esters, in the presence of a conventional esterinterchanging catalyst at a temperature of 150° to 230° C for the ester interchange reaction. After distilling off methanol, the polycondensation reaction may be carried out at a temperature of 200° to 260° C under a pressure of less than about 3mm Hg to produce polybutylene terephthalate/phthalate copolyester. In another method, terephthalic acid and phthalic acid may be used in place of dimethyl terephthalate and dimetyl phthalate respectively. It is also possible to polymerize a mixture of bis(hydroxybutyl) terephthalate, which is produced from terephthalic acid and 1,4-butanediol, and bis(hydroxybutyl)-phthalate, which is produced from phthalic anhydride and 1,4-butanediol. A mixture of terephthalic acid, phthalic anhydride and 1,4-butanediol may be directly ester interchanged and polycondensed to a high polymeric copolyester. In still other method, the copolyester of the present invention may also be prepared by melt blending two homopolymers, i.e., polybutylene terephthalate and polybutylenephthalate, optionally in the presence of a small amount of ester-interchanging catalysts. Those two homopolymers are converted to a random copolyester through the ester interchange reaction. The period of melt-blending is more than about 10 minutes, preferably 15 to 90 minutes.

The catalysts used on preparing the copolyester of the present invention is not specifically restricted. Preferable catalysts, however, may be organic titanates, such as tetrabutyl titanate, which may optionally be used solely or in combination with an acetate of magnesium, calsium or zinc. A titanate complex represented by the formula, Mg [HTi(OR)$_6$]$_2$, which is derived from an alkali or alkaline earth alkoxide and a titanate ester, may be one of the preferable catalysts.

The copolyester described in this invention originally has an excellent heat-resistance and weatherability, but may have added thereto stabilizers such as antioxydants and ultraviolet absorbers in order to develop the stabilities of the copolyester. The typical stabilizers may be hindered phenols and aromatic amines, such as N,N'-bis($\beta$-naphtyl)-p-phenylene diamine.

The physical properties of the copolyester of the present invention may be modified by incorporating therein various inorganic fillers such as glass fiber, carbon fiber, carbon black, silica gel, asbestos and alumina. The composite comprising the copolyester of the present invention and those fillers may have an improved property in respect to their tensile modulus, shrinkage at molding and resistance to long-term tensile creep.

The copolyester of the present invention may be utilized in various fields because it has excellent physical properties such as flexibility and elastic recovery, and is chemically stable. The copolyester has excellent thermal stability at processing temperatures, remarkable flowing property in a molten state, relative insensitivity to moisture, and a rapid hardening rate. Thus the copolyester can be readily injection, compression, blow or extrusion-molded to elastic molded articles. Those articles may be films, sheet, tubing, hose, other forms having complicated cross sections, wire, cable and other substrate covers. The copolyester of the present invention may also contain nucleating agents for elevating the hardening rate.

Further the copolyester of the present invention has a good permeability to other synthetic polymers such as polybutylene terephthalate, polyethylene isophthalate, poly-$\epsilon$-capramide, poly-1,6-hexamethylene adipamide, polystyrene and polyvinyl chloride etc. Therefore, the copolyester may be blended with these thermoplastic resins in order to improve their impact resistance.

The copolyester of the present invention may also be improved in the elastomeric property by drawing at a temperature higher than room temperature and about 10° C lower than the melting point of the polymer. The copolyester may be oriented by drawing at 1.5 to 5 times its original length at a temperature higher than room temperature and about 10° C lower than the melting point of the polymer, preferably lower than 90° C. Thus, the copolyester may be preferably utilized as elastic filaments or films. On spinning such elastic filaments a good spinning-stability can be attained because of a superior thermal stability at an extrusion temperature of the copolyester in comparison with polyurethane.

Furthermore the copolyester of the present invention shows good adhesive properties to the surface of synthetic resins such as polyesters and polyamides, various kinds of metal, glass, wood blocks and leather at an elevated temperature. Therefore, the copolyester may be utilized as hot-melt adhesives or hot-melt coatings, which have excellent properties such as flexibility, heat stability, chemical stability and insensitivity to moisture.

The present invention will be further illustrated by following the examples without the intention to restrict the invention thereto.

EXAMPLE 1

In the glass flask having a stainless steel stirrer with a helical ribbon type screw, 113.5 parts of dimethyl terephthalate, 61.1 parts of dimethyl phthalate and 121.5 parts of 1,4-butanediol were placed in the presence of 0.08 parts of tetrabutyl titanate. The mixture was heated with stirring at 210° C for 2 hours to distil off methanol from the reaction system. The recovered methanol was 52.0 parts corresponding to 90% of theoretical weight. The reaction temperature was then raised to 245° C and the pressure on the system was reduced to 0.1mm Hg for a period of 1 hour. When polymerization was continued for 3 hours under the above conditions, the resultant transparent and viscous molten polymer was prepared. The intrinsic viscosity of the product in orthochlorophenol at 25° C was 1.30 and the polymer showed a melting point of 170° C. Using samples prepared by compression molding at 220° C to films, the mechanical properties were tested. Results were as shown in table 1. The Polymer's melting point was measured by Rigaku Denki's Thermomechanical Analysis (TMA). The melting point was defined to be the temperature at which the pin penetrated into the polymer sample in the depth of 250$\mu$; pin size 0.5mm$\phi$, load 5g, temperature increasing rate 10° C/min. For comparisons, when ethylene glycol was used in place of 1,4-butanediol, a high molecular weight copolyester (A) was not obtained. The film sample prepared from (A) was too brittle to evaluate. Using dimethyl isophthalate and dimethyl sebacate in place of dimethyl phthalate, copolyester (B) and copolyester (C) were respectively prepared under the same reaction conditions as Example 1. Copolyester (B) for comparison was stiff and poor in elastic recovery. On the other hand, copolyester (C) for comparison was extremely soft but poor in elastic recovery because the necking easily took place by elongation.

TABLE 1

|  | Polymer of this example 1 | Polymers for Comparison | |
| --- | --- | --- | --- |
|  |  | Copolyester (B) | Copolyester (C) |
| Polymer Composition (Composition Ratio) | Polybutylene terephthalate/ Polybutylene phthalate (65/35) | Polybutylene terephthalate/ Polybutylene isophthalate (65/35) | Polybutylene terephthalate/ Polybutylene sebacate (65/35) |
| Intrinsic Viscosity | 1.30 | 1.28 | 1.35 |
| Melting Point (° C) | 170 | 168 | 170 |
| Tensile Strength (Kg/cm$^2$) | 200 | 310 | 140 |
| Elongation at Break (%) | 270 | 120 | 210 |
| Tensile Modulus (Kg/cm$^2$) | 3,200 | 14,000 | 1,900 |
| Elastic Recovery* (%) |  |  |  |
| 100% elongation | 50 | 7 | 15 |
| 20% elongation | 92 | 10 | 25 |

*relaxation time : 10 min.

EXAMPLE 2

Using the copolyester chip prepared in Example 1, sheet samples of about 1mm thick were prepared by compression molding at 220° C. These sheet samples were elongated 100% (double of their original length) and kept stretched for 10 minutes at 80° C followed by relaxation of stretching for 10 minutes. After the first elastic recovery ($R_1$) was measured, the samples were then elongated 100% once more and relaxed. These procedures were repeated 10 times. The elastic recovery (Rn) of the copolyester was excellent after these elongation-relaxation procedures. On the other hand, samples prepared from copolyester (B) or (C) for comparisons did not appear the characteristics of elastic recovery after several times of elongation-relaxation.

TABLE 2

| Times of Elongation-Relaxation (n) | Elastic Recovery (Rn) |
| --- | --- |
| 1 | 50 |
| 2 | 78 |
| 3 | 85 |
| 4 | 87 |
| 5 | 89 |
| 6 | 89 |
| 7 | 91 |
| 8 | 92 |
| 9 | 92 |
| 10 | 93 |

EXAMPLE 3

To 1.99 parts of terephthalic acid, 1.18 parts of phthalic anhydride and 0.0384 parts of trimellitic anhydride were added 3.60 parts of 1,4-butanediol. After heating together at 210° C in the presence of 0.0016 parts of tetrabutyl titanate, the temperature was increased to 230° C and the pressure reduced to 0.3mm Hg for a period of 70 minutes. Then, the temperature of a mixture was increased to 245° C and the polymerization reaction was continued for 3 hours. The intrinsic viscosity of the copolyester was 1.25 and the melting point was 162° C. The polymer was extruded into filaments by a conventional melt-spinning method, then drawn 4 × (four times its original length) across the plate heated at 40° C followed by heat-set in steam at 110° C for 30 min. to produce the elastic yarn. This yarn exhibits the properties as listed below.

Filament denier: 1.5 d
Elongation at break: 210%
Tenacity: 2.4 g/d
Initial modulus: 0.85 g/d
Elastic recovery in 10 min. from 50% extension: 96.0%
Elastic recovery in 10 min. from 100% extension: 92.5%

After thermal aging test at 140° C for 100 hours in gearoven, this yarn maintained almost initial properties, for example, molecular weight (100% retention) and elongation at break (93% retention). The yarn also exhibits good resistance to UV irradiation, and therefore apparent coloration and the decrease of molecular weight were not detected after UV irradiation at 50° C for 100 hours in a Fade-O-Meter.

For comparison, the segmented copolyether ester elastomer, which contains poly(tetramethylene oxide)-glycol as the soft segments, was prepared under the usual polymerization conditions using materials listed below.

Materials

Terephthalic acid: 159 parts
Isophthalic acid: 39.8 parts
Poly(tetramethylene oxide)glycol; MW = 1000: 200 parts
1,4-Butanediol: 177 parts Polyether ester Hard segment: polybutylene terephthalate/polybutylene isophthalate = 80/20
Soft segment: 50% (by weight of copolymer)
Melting point: 162° C
Intrinsic Viscosity: 1.26

The copolyether ester was spun followed by drawing and relaxation under the same conditions as described in Example 3. The undrawn yarn showed a considerable degree of stickiness between filaments and swelling in preparation, therefore melt-spinning in the customary manner was difficult. Although the drawn yarn showed good elastic recovery, it was poor in thermal stability or weatherability. Under the same aging conditions in a Gear Oven and a Fade-O-Meter as in Example 3, the yarn showed a catastrophic decrease of molecular weight in 15 hours so as to be completely brittle.

EXAMPLE 4

Using 1.66 parts of terephthalic acid, 1.48 parts of phthalic anhydride and 3.60 parts of 1,4-butanediol on the catalyst system of tetrabutyl titanate and zinc acetate, copolyester comprising polybutylene terephthalate and polybutylene phthalate (1:1 by molar ratio) was prepared. The copolyester had a melting point of 139° C and a intrinsic viscosity of 1.03. The film prepared by press molding at 200° C showed good elastic properties as listed below.

Elongation at break: 570%
Tensile modulus: 2000 kg/cm$^2$
Elastic recovery in 10 min. from 100% elongation ($R_1$): 72%
Elastic recovery after 4 times elongation-relaxation ($R_4$): 94%

What we claim is:

1. A thermoplastic copolyester elastomer derived from the reaction of a mixture comprising a dicarboxylic acid component, and a diol component, wherein the dicarboxylic acid component is mainly composed of terephthalic and phthalic acids in which the molar ratio of terephthalic acid to phthalic acids is about 80/20 to 35/65, and the diol component is mainly composed of 1,4-butanediol.

2. A thermoplastic copolyester elastomer according to claim 1, wherein the molar ratio of terephthalic/phthalic acids is about 70/30 to about 40/60.

3. An elastic fiber formed from a copolyester defined according to claim 1.

4. An elastic fiber according to claim 3, wherein the copolyester is oriented by drawing about 1.5 to 5 times.

5. An elastic film formed from a copolyester defined according to claim 1.

6. An elastic film according to claim 5, wherein the copolyester is uni-or biaxially oriented by drawing about 1.5 to 5 times.

7. A thermoplastic copolymer elastomer derived from the reaction of a mixture comprising (A) a dicarboxylic acid or a dicarboxylic acid functioning derivative consisting essentially of terephthalic acid and phthalic acid, wherein the molar ratio of terephthalic acid to phthalic acid is about 80/20 to 35/65, and (B) a diol component consisting essentially of 1,4-butanediol, said elastomer being oriented by drawing about 1.5 to 5 times.

* * * * *